United States Patent
Pognant-Gros et al.

(10) Patent No.: US 10,186,878 B2
(45) Date of Patent: Jan. 22, 2019

(54) SYSTEM AND METHOD FOR BALANCING THE CHARGE OF A PLURALITY OF ENERGY STORAGE MODULES

(71) Applicant: IFP Energies nouvelles, Rueil-Malmasion (FR)

(72) Inventors: Philippe Pognant-Gros, Francheville (FR); Dimitri Olszewski, La Celle Saint Cloud (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 47 days.

(21) Appl. No.: 15/103,713

(22) PCT Filed: Nov. 26, 2014

(86) PCT No.: PCT/EP2014/075649
§ 371 (c)(1),
(2) Date: Jun. 10, 2016

(87) PCT Pub. No.: WO2015/086321
PCT Pub. Date: Jun. 18, 2015

(65) Prior Publication Data
US 2016/0308375 A1    Oct. 20, 2016

(30) Foreign Application Priority Data

Dec. 10, 2013 (FR) ..................... 13 62358

(51) Int. Cl.
*H02J 7/00* (2006.01)
*B60L 11/18* (2006.01)
*H02J 7/02* (2016.01)

(52) U.S. Cl.
CPC ........... *H02J 7/0016* (2013.01); *B60L 11/182* (2013.01); *B60L 11/1861* (2013.01);
(Continued)

(58) Field of Classification Search
USPC ........................................ 320/108
See application file for complete search history.

(56) References Cited

U.S. PATENT DOCUMENTS

| 2004/0135545 | A1 | 7/2004 | Fowler et al. |
| 2011/0076525 | A1* | 3/2011 | Zhang ............... H01M 10/42 |
| | | | 429/10 |

(Continued)

FOREIGN PATENT DOCUMENTS

| WO | 2008/115538 A1 | 9/2008 |
| WO | 2012/040496 A1 | 3/2012 |
| WO | 2013/035238 A1 | 3/2013 |

OTHER PUBLICATIONS

International Search Report for PCT/EP2014/075649 dated Feb. 9, 2016; English translation submitted herewith (5 Pages).

*Primary Examiner* — Arun C Williams
(74) *Attorney, Agent, or Firm* — Fitch, Even, Tabin & Flannery LLP

(57) ABSTRACT

The invention is a system and a method for active balancing of several coupled energy storage modules (10). The modules are controlled either as master module to be discharged or as slave module to be charged. Balancing is being implemented by the charge of a magnetic storage element (2, 11, 12) of the master module. The invention pools the balancing and coupling functions.

42 Claims, 4 Drawing Sheets

(52) U.S. Cl.
CPC ......... *B60L 11/1864* (2013.01); *H02J 7/0014* (2013.01); *H02J 7/025* (2013.01)

(56) References Cited

U.S. PATENT DOCUMENTS

2012/0068665 A1   3/2012  Hartzog
2014/0347013 A1*  11/2014 Kim ................... G01R 31/3606
                                                    320/134

\* cited by examiner

SYSTEM AND METHOD FOR BALANCING THE CHARGE OF A PLURALITY OF ENERGY STORAGE MODULES

CROSS REFERENCE TO RELATED APPLICATIONS

Reference is made to PCT Application PCT/EP2014/075649 filed Nov. 26, 2014, and French Patent Application No. 13/62.358 filed Dec. 10, 2013, which are incorporated herein by reference in their entirety.

BACKGROUND OF THE INVENTION

Field of the Invention

The present invention relates to the balancing the charge of electric batteries, in particular for electric or hybrid motor vehicles.

Description of the Prior Art

When a battery is used notably in an electric or hybrid vehicle, the cells making up the battery (or an electrical energy storage module) undergo charge and discharge cycles. The dispersion of the characteristics of the various cells, in particular the faradaic efficiency, causes charge imbalances during the life of the battery. The cells must remain within a well-defined operating range.

In order to maintain the battery capacity while extending its life and safe use, balancing the various cells that make up the battery is essential. Balancing transfers charges between the cells so that they all have the same state of charge (SOC) and the same voltage level. As soon as a cell is outside its operating range, the entire battery is affected. To maintain the best battery performance, the balancing system must operate at each cell. For the balancing system to be efficient, the state of charge of each cell needs to be known.

In the literature, several solutions are provided for balancing battery cells. These solutions can be classified into two families: dissipative and non-dissipative.

In the case of the first family, implementation is simple. Part of the energy of the most charged cells is dissipated, in a resistor for example, which decreases the charge of these cells and therefore of the battery. To date, battery packs or modules mostly have passive balancing systems. Which are a resistor switched by semiconductors and thus allow, upon BMS (Battery Management System) request, to discharge the most charged cells by dissipating through the Joule effect the excess stored energy. This system involves energetically levelling the most charged cells in relation to the least charged cells of the pack or module. This system is generally activated only during charging phases outside the use of the pack or the module to avoid penalizing the energy available for the consuming application. This system also involves the drawback of overheating and of being inefficient for highly constrained applications in terms of balancing and/or of imbalance energy level.

In order to overcome these constraints and in contrast with the passive systems, systems referred to as active or non-dissipative systems are used. They afford the advantage of not dissipating stored energy through the Joule effect to eliminate the imbalance of energy. Instead the excess stored energy is restored to the pack or the module.

The active system family also comprises two energy storage categories, which are known as capacitive and inductive. For example, patent applications WO-2013/035, 238, WO-2012/040,496 and WO-2008/115,538 describe shared inductive balancing systems.

FIG. 1 illustrates a prior art balancing structure referred to as shared-inductor structure. FIG. 1 shows three cells in series. It is however understood that a larger number of cells connected in series and in parallel are typically used. The main advantage of this known structure is to share the component that stores the imbalance energy. This structure is also interesting because it does not require a highly complex control circuit insofar as the energy stored in the inductor through a cell is restored in all the cells of the module.

The structure is made up of the following elements, as illustrated in FIG. 1:
- several electrochemical cells 1 forming the battery (or module),
- a battery management system BMS,
- one or more energy storage inductors 2 arranged in series,
- controlled switches SW, SW up, SW down, semiconductors for example, preferably unidirectional current switches; the switches, controlled or not, SW, SW up and SW down can for example be Mosfets or power diodes; example embodiments of these controlled switches are illustrated in FIG. 2, these controlled switches SW, SW up and SW down are arranged between a cell 1 and inductor 2,
- a switch control circuit 6,
- a circuit 4 for measuring the differential voltage of the cells,
- a circuit 3 for measuring the current in the inductor(s),
- a logic circuit_5 for selecting the cell to be discharged.

The balancing system operating sequence is as follows:
- stage 1 is reception of a balancing allowance from the BMS;
- stage 2 is measurement of the differential voltages of cells 1;
- stage 3 is determination of the most charged cell 1;
- stage 4 is commanding closing switches SW of the most charged cell 1 selected;
- stage 5 is discharging of the most charged cell 1 selected into inductor 2 up to the Imax value selected (adjustable parameter);
- stage 6 is commanding opening switches SW of the most charged cell 1 selected;
- stage 7 is discharging of inductor 2 in full into all the cells 1 of the module (or pack); and
- stage 8 is repeating stage 2 until balancing of all the cells is detected or in case of a stop command by the BMS.

In another embodiment, stages 4 to 7 can be performed several times prior to returning to stage 2. This can be interesting if the voltage variation of the discharged cell over a cycle (charge+discharge) is very low and therefore imperceptible by the cell voltage acquisition chain.

In another variant embodiment, it is possible to change the maximum current Imax flowing through the inductor. This can be advantageous to make the design more robust, especially when limiting operating conditions are reached, for example when the ambient temperature is already very high.

For different battery applications, it is commonplace to couple several modules or packs, notably in parallel. Concerning the parallel connection of packs or modules, the systems available on the market are essentially manual or semi-automatic switched systems with highly constrained conditions of use. This parallel connection of packs or modules is implemented when it is desired to increase the available power and/or energy of the initial pack or module.

Automation of this function is interesting since it is the user and not a qualified technician who performs this operation. When several modules or packs are arranged in parallel, it is necessary to first equalize their voltage level and thus, implicitly, their state of charge (SOC) in order to perform the electrical connection operation under good conditions, notably by preventing too high a transient discharge current from damaging or even imperilling the modules or packs. However, active balancing systems only allow balancing of the cells of a module, and not balancing of several coupled modules or of cells of coupled modules.

SUMMARY OF THE INVENTION

The invention relates to a system for active balancing of several coupled modules in which the modules are controlled either as master module to be discharged or as slave module to be charged, and balancing is implemented by the charge of a magnetic storage element of the master module. The invention through electronic structures and control techniques, on the one hand, pools the balancing and coupling functions at a lower cost and with addition of components improves or even eliminates the limitations described above.

The invention relates to a system for balancing the charge of at least two coupled electrical energy storage modules. Each module comprises at least one electrochemical cell, balancing means including at least one magnetic storage element, and means for coupling to the other modules. Each coupling means comprises control means allowing controlling the module either as master module to be discharged or as slave module to be charged, so that the charge of at least one cell of the slave module is achieved through the discharge of at least one cell of the master module by use of the magnetic storage element of the master module.

According to the invention, each module control comprises two switches, which when closed, allow the current to flow in a single direction to allow either charge or discharge the module.

Advantageously, the balancing system also comprises means enabling communication between the modules.

Preferably, the coupling means comprises main contactors and a secondary contactor.

Furthermore, the coupling means can comprise connecting terminals.

According to one aspect of the invention, each module also comprises a battery management system that controls balancing of the charge.

According to an embodiment of the invention, the balancing means are shared-inductor balancing means comprising switching means actuated for charging or discharging. The switching means are arranged between a cell and the shared inductor.

Alternatively, the magnetic storage element comprises at least one transformer.

The invention also relates to a hybrid or electric vehicle, notably a motor vehicle, comprising a balancing system according to the invention.

Furthermore, the invention relates to a method for balancing the charge of at least two coupled electrical energy storage modules. Each module comprises at least one electrochemical cell, balancing means including at least one magnetic storage element, and means for coupling to the other modules. For the method, the following steps are carried out:

a) identifying at least one module to be charged and one module to be discharged, b) controlling the module to be discharged as master module and the module to be charged as slave module, c) performing balancing by the charging of at least one cell of the slave module by discharging at least one cell of the master module with a magnetic storage element of the master module.

According to the invention, the module to be charged or discharged is identified by measuring and comparing the voltage of each module.

Preferably, at least the most charged cell of the master module is identified and balancing is performed by the charging of at least one cell of the slave module through the discharging of the most charged cell of the master module.

Advantageously, the modules are controlled as slave module(s) and master module(s) by actuating switching means integrated in the coupling means of each module.

According to an aspect of the invention, step c) is repeated until balancing of the cells is achieved.

BRIEF DESCRIPTION OF THE DRAWINGS

Other features and advantages of the method according to the invention will be clear from reading the description hereafter of embodiments given by way of non-limitative example, with reference to the accompanying figures wherein.

DETAILED DESCRIPTION OF THE INVENTION

The present invention relates to balancing of the charge of electrical energy storage systems notably having electrochemical cells, electronic power and signal boards, as well as electrotechnical and cooling management equipment enclosed in a compartment, which may be sealed. This type of electrical energy storage system is known as battery pack or battery module depending on the on-board energy and/or voltage level. A pack is generally made up of several modules.

The invention specifically concerns electronic balancing and coupling (parallel connection) systems for battery packs or modules. In the rest of the description, the term module is used to designate in a general way a module or a pack.

Figure 1:
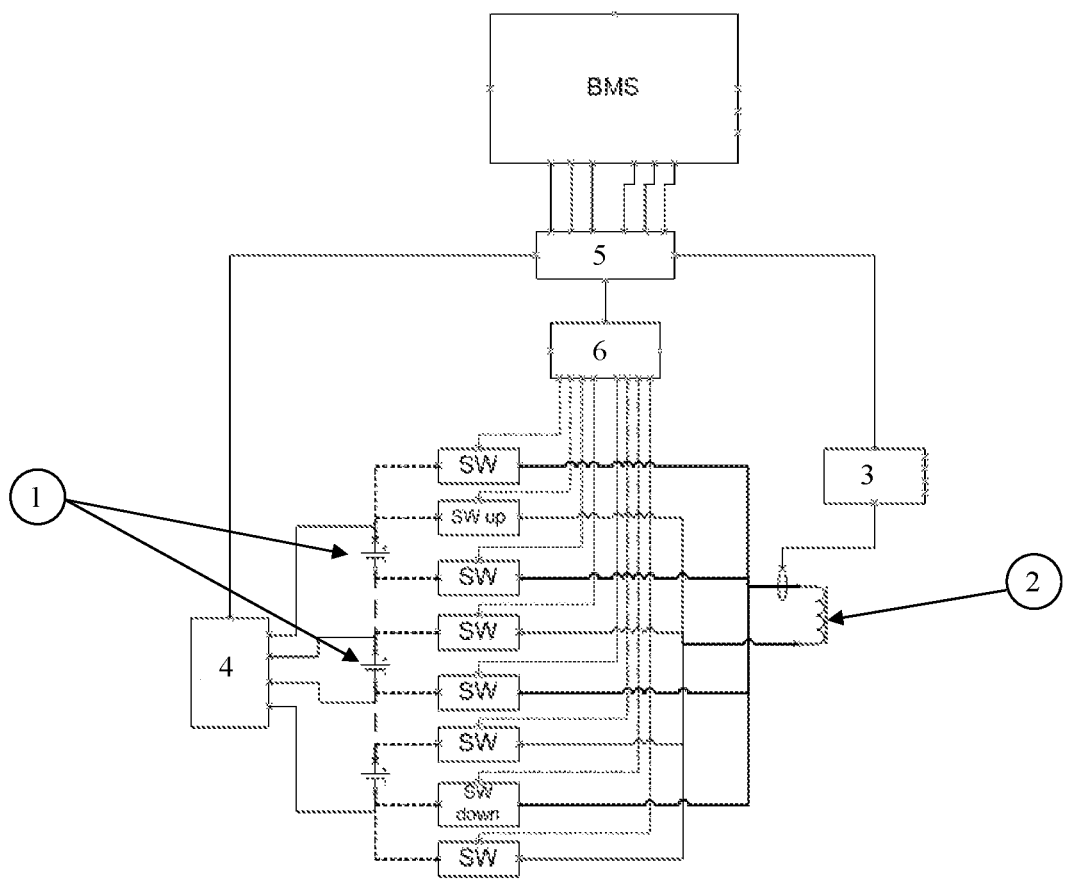
FIG. 1, already described, illustrates a shared-inductor module balancing system according to the prior art.

Each module comprises:
- at least one cell, preferably several electrochemical cells for electrical energy storage,
- means for coupling to the other modules,
- a battery management system (BMS), and
- active balancing means (for example according to the structure described in FIG. 1).

According to the invention, each coupling means comprises module control means. The module control means of each module controls the module either as master module or as slave module. Preferably, a single module is controlled as a master module and the other modules are controlled as slave modules. The master module is the module that discharges in order to enable charging of the less charged modules. The slave modules are those charged by the master module. Thus, coupling and balancing of the modules is pooled and performed without significant change to the modules.

The module control means can comprise controlled switching means allowing the module to be made a master or a slave module. According to an embodiment of the invention, the switching means notably comprise two controlled switches, with each switch allowing passage of the current in a single direction, either in the direction allowing the module to be charged (case of the slave modules), or in the direction allowing the module to be discharged (case of the master module).

Figure 5:
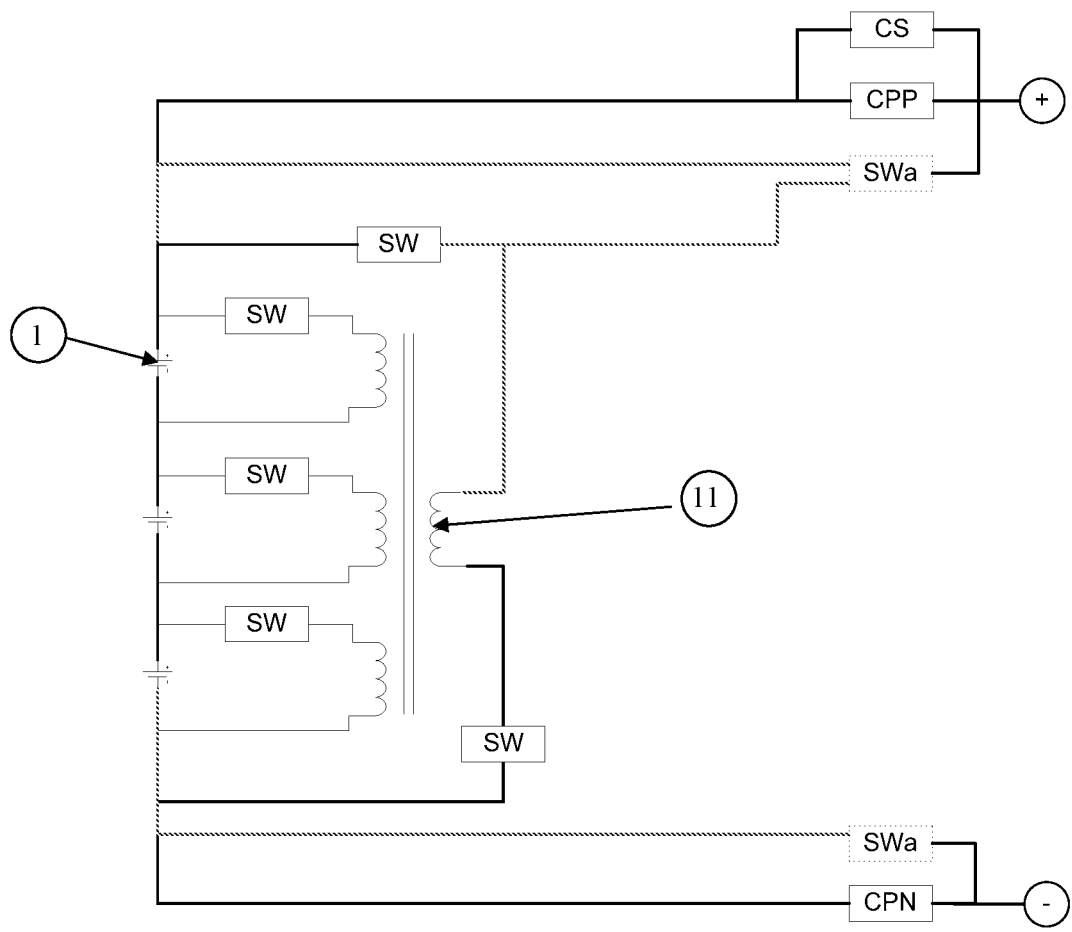
FIGS. 5 and 6 illustrate two balancing systems with transformers for a module for a balancing system according to the invention.
Figure 6:
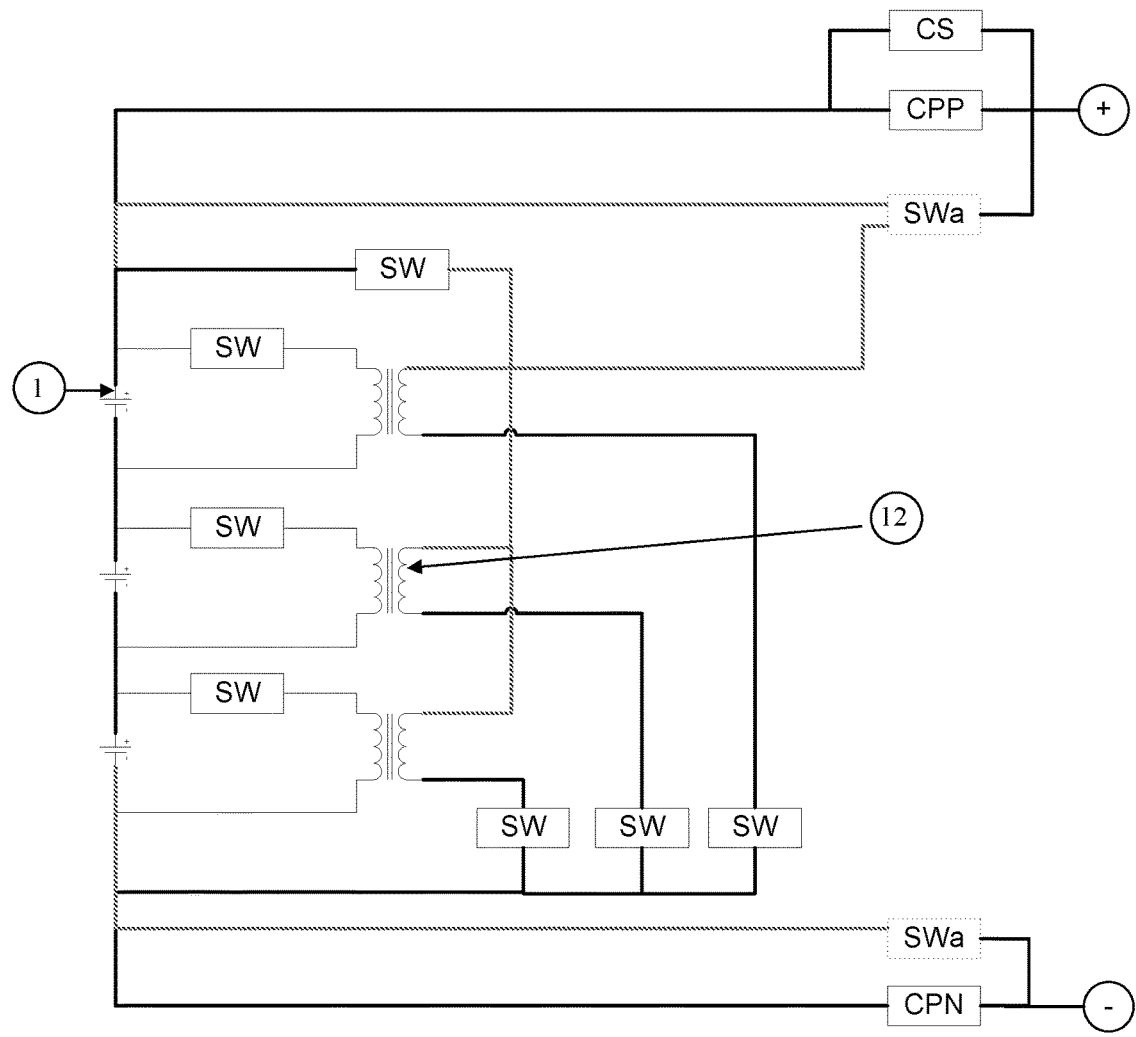

According to the invention, the means allowing active balancing of the module comprise at least one magnetic storage element. The magnetic storage element can come in the form of a coil that temporarily stores electrical energy (from the module to be discharged) prior to subsequently discharging into at least one cell (of the module to be charged). The magnetic storage element can notably be an inductor, a transformer, etc. According to a first example embodiment, the active balancing means have a shared-inductor structure as illustrated in FIG. 1. According to a second aspect of the invention, the active balancing means have a transformer structure as illustrated in FIGS. 5 and 6.

Figure 3:
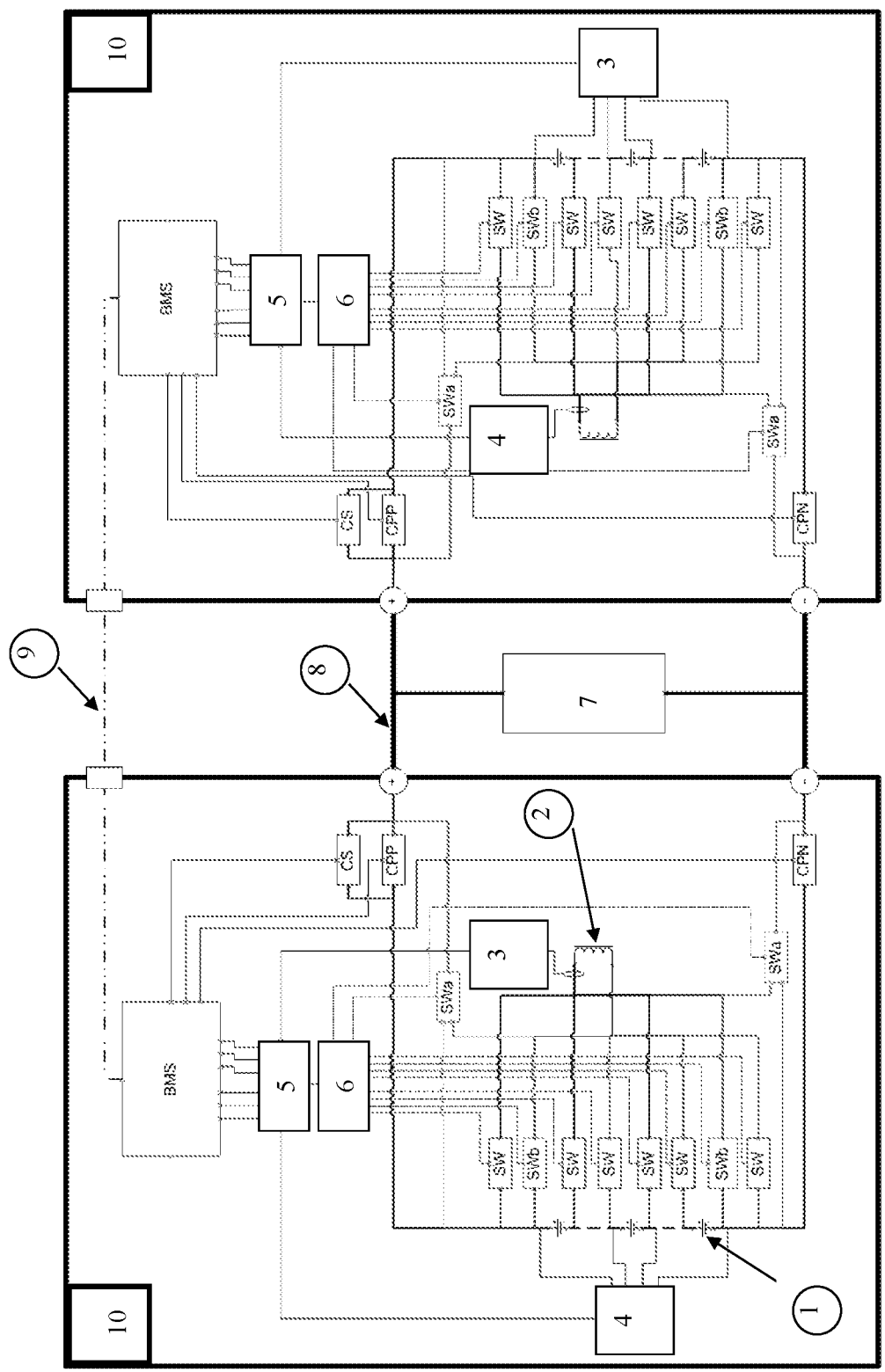
FIG. 3 illustrates an example of a balancing system according to the invention for two coupled modules.

FIG. 3 illustrates a non-limitative example of a balancing system according to the invention for two coupled modules (the number of modules is not limited) with a shared-inductor balancing structure. For this example, each module 10 conventionally comprises:
three electrochemical cells 1 arranged in series (this number is not limitative, the balancing system according to the invention can comprise two or more than three cells, and the number of cells can be different from one module to the other),
shared-inductor balancing means as illustrated in FIG. 1, comprising:
at least one shared energy storage inductor 2,
controlled switches SW and SWb, semiconductors for example, preferably unidirectional current switches; implementation examples of such controlled switches can for example be Mosfets and power diodes, controlled switches SW and SWb arranged between a cell 1 and shared inductor 2,
a circuit 3 for measuring the current in shared inductor 2,
a circuit 4 for measuring the voltage of cells 1,
balancing control means consisting notably of a control circuit 6 for controlled switches SW, Swa and SWb, and a logic 5 for selecting the cell to be discharged, and
a battery management system BMS.

The shared-inductor structure is known in the art and involves mainly sharing the component that stores the imbalance energy. This structure is also interesting because it does not require a highly complex control circuit since the energy stored in the inductor through a cell is released in all the cells of the module. However, other balancing means structures, notably transformer structures, are also usable with the invention.

For pooling coupling and balancing according to the invention, each module furthermore comprises:
communication means 9 between the modules, notably between the battery management systems BMS of the modules;
coupling means comprising notably main contactors CPP and CPN, and a secondary contactor CS for precharging of the module. Contactors CPP and CPN allow electrical isolation of the module from the electricity network, for functional and dysfunctional requirements of the module, and precharge contactor CS allows slowly charge the capacitors of the electricity network to avoid stressing them. This precharging operation is carried out before the closing of the main contactors and of the + and − connecting of terminals of the modules which are mounted in parallel and on which an electric device 7, notably an electric machine, can be mounted; main contactors CPP and CPN are connected to the ends of the series connection, respectively at the positive and negative poles, the secondary contactor is in parallel to main contactor CPP, and the + and − connecting terminals are connected in series with main contactors CPP and CPN; and
control means comprising switching means SWa for controlling the module as slave module or master module.

Thus, the shared-inductor balancing means allows balancing within a module and between the modules.

Figure 2:
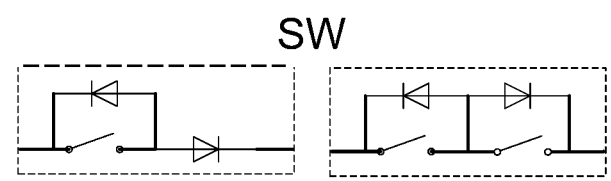
FIG. 2, already described, illustrates the switch types of the balancing system of FIG. 1.
Figure 2:
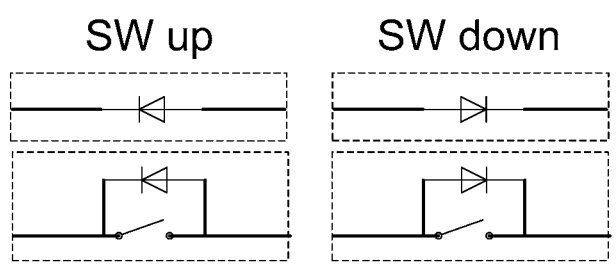
Figure 4:
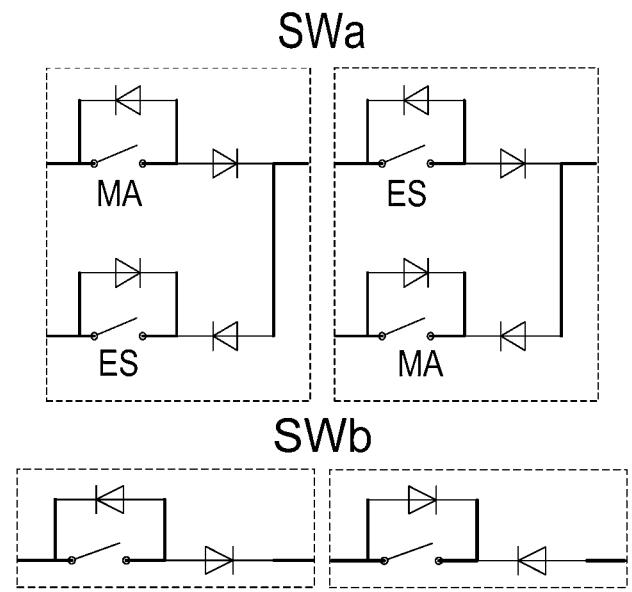
FIG. 4 illustrates the switch types of the balancing system of FIG. 3.

FIG. 4 illustrates the circuits of controlled switches SWa and SWb according to an embodiment of the invention. Controlled switch SWa comprises two circuit parts, a first part MA allowing controlling the module as master module by closing the switch and allowing the current to flow in one direction by use of a diode, and a second part ES allowing control of the module as slave module by closing the switch and allowing the current to flow in one direction by use of a diode. It is noted that switch SWa connected to the − terminal of the module has a designation inversion MA and ES for obvious reasons of current circulation between the + and − terminals of the module. Furthermore, according to the invention, switches SW up and SW down of the shared-inductor balancing means as illustrated in FIG. 2 have been replaced by switches SWb illustrated in FIG. 4.

This embodiment example is not limitative so there can be a third pack or module, or there can be no contactor CPN, etc.

The master module controls its module only in order to ensure energy transfers. The slave module is passive after being configured in this mode since it does not need to be controlled to receive energy.

FIGS. 5 and 6 illustrate two additional embodiments of the invention where the active balancing means comprises at least one transformer. In these figures, only one module is shown and the control means, the measuring means, the communication means and the BMS, which are identical to the embodiment of FIG. 4, are not illustrated. For these variant embodiments, at least one cell of the master module discharges into the transformer and then the energy stored in the transformer is used for charging the slave module.

For the embodiment of FIG. 5, cells 1 are connected to a single transformer 11 by switches SW. As in the embodiment of FIG. 4, the balancing system comprises module control means SWa (notably using controlled switches), main contactors CPP and CPN, as well as a secondary contactor CS.

For the embodiment of FIG. 6, each cell is connected to a transformer 12 by switches SW. As in the embodiment of FIG. 4, the balancing system comprises module control means SWa (notably using controlled switches), main contactors CPP and CPN, as well as a secondary contactor CS.

The balancing converters according to the invention can be used for any type of battery, but they are particularly suited for lithium-ion batteries. Indeed, a poorly controlled charging for this technology can lead to the destruction of the battery.

The invention can be integrated on board electric or hybrid vehicles comprising a battery. The vehicles may notably be motor vehicles, two wheelers, aircraft, watercrafts or hovercraft type vehicles.

Furthermore, the invention relates to a method for balancing the charge of at least two coupled modules. Each module comprises at least one electrochemical cell, balancing means with a magnetic storage element (inductor, transformer, etc.), and means for coupling to the other modules. For the method, the following are carried out:

a) identifying at least one module to be charged and at least one module to be discharged, for example, identifying the module to be charged or to be discharged by measuring and comparing the voltage of each module, b) controlling the module to be discharged as the master module and the module to be charged as the slave module, for example, by controlling the modules as a slave module and a master module by actuating switching means integrated in the coupling means of each module; and c) performing balancing by charging of at least one cell of the slave module through the discharging of at least one cell of the master module by use of the magnetic storage element (shared inductor for example) of the master module.

This stage can be repeated to balance the charge of all the cells of all the modules or until the master module is no longer the most charged module or until reception of a stop request from the battery management system of the master module.

Preferably, a single cell of the master module is discharged into a plurality or all of the cells of the slave module. According to an embodiment of the invention, at least the most charged cell of the master module is identified and balancing is performed by the charging of at least one cell of the slave module through the discharge of the most charged cell of the master module.

The method according to the invention can be adapted to the system as described above, notably as illustrated in FIG. 3.

An example of an operating sequence of the balancing and coupling/parallel connection system with a shared-inductor structure according to the invention can be as follows:

stage 1 is reception of a request for coupling modules from a battery management system BMS through communication means 9;

stage 2 is reception of a request for shifting to a master or a slave module from the battery management system BMS with the master module being identified as the module to be discharged, for example by detecting the most charged module. According to an example, the BMS of each module sends its voltage measurement to the multiplexed network, then the BMS decides to shift its module to being a slave module, if the measured voltage is lower than that of the second pack or to master module if the measured voltage is higher than that of the second pack or module;

stage 3 is commanding to open switches "SWb" with control circuit 6 in order to block the circulation of the recharge current in the cells of the module. For example, if the module is configured as master, it is not desired that the energy stored in the inductor is discharged into its own module;

stage 4 is commanding to closed switches "SWa ES" for the modules or packs identified as "slave" and commanding to close switches "SWa MA" for the module or pack identified as "slave" with the command being made by control circuit 6;

stage 5 is inhibiting of controls "SW" of the modules or packs identified as being slaves;

stage 6 is measuring of the differential voltages of the cells of the pack or module identified as master;

stage 7 is determination of the most charged cell of the pack or module identified as master, stage 8 is commanding closing switches "SW" of the cell to be discharged (or the most charged cell) of the pack or module identified as a master, with the command being made by control circuit 6;

stage 9 is discharging of the cell selected into the inductor up to an Imax current value selected (adjustable parameter) in order not to saturate the inductor (that has a saturable magnetic circuit), which might cause dangerous and irreversible system dysfunction;

stage 10 is commanding to open switches "SW" of the most charged cell selected by the control circuit 6;

stage 11 is discharging of the inductor of the master module in full into all the cells of the packs or modules identified as slaves; modules and stage 12 is iteration from stage 6 until balancing of all the cells is detected or until reception of a stop request by the BMS of the master module.

According to a variant embodiment of the method according to the invention, stages 6 and 7 can be eliminated. It is then possible to control switch "SW" of the most upstream cell and that of the most downstream cell of the pack or module. In this case, the inductor is no longer charged to the voltage of a cell but to the voltage of the entire pack or module. The cell voltage measuring function can be inhibited with this operating mode.

The invention claimed is:

1. A system for balancing charging of at least two electrical energy storage modules comprising:

each module including at least one electrochemical cell, a balancing system including at least one magnetic storage element, and a plurality of means for coupling to the modules with each means for coupling including a control for controlling the modules either as master module to be discharged to charge at least one slave module or as slave module to be charged; and wherein charging of at least one cell of the slave module is achieved by discharging at least one cell of the master module with charge from the at least one magnetic storage element of the master module.

2. A system as claimed in claim 1, wherein the control comprises switches which are closed to allow current to flow in a single direction to allow either charging or discharging of the module.

3. A system as claimed in claim 1, wherein the balancing system comprises means enabling communication between the modules.

4. A system as claimed in claim 2, wherein the balancing system comprises means enabling communication between the modules.

5. A system as claimed in claim 1, wherein the plurality of coupling means each comprises main contactors and a secondary contactor.

6. A system as claimed in claim 2, wherein the plurality of coupling means each comprises main contactors and a secondary contactor.

7. A system as claimed in claim 3, wherein the plurality of coupling means each comprises main contactors and a secondary contactor.

8. A system as claimed in claim 4, wherein the plurality of coupling means each comprises main contactors and a secondary contactor.

9. A system as claimed in claim 1, wherein the plurality of coupling means each comprises connecting terminals.

10. A system as claimed in claim 2, wherein the plurality of coupling means each comprises connecting terminals.

11. A system as claimed in claim 3, wherein the plurality of coupling means each comprises connecting terminals.

12. A system as claimed in claim 5, wherein the plurality of coupling means each comprises connecting terminals.

13. A system as claimed in claim 1, wherein each module comprises a battery management system which controls balancing of charging of at least one electrochemical cell of the modules.

14. A system as claimed in claim 2, wherein each module comprises a battery management system which controls balancing of charging of at least one electrochemical cell of the modules.

15. A system as claimed in claim 3, wherein each module comprises a battery management system which controls balancing of charging of at least one electrochemical cell of the modules.

16. A system as claimed in claim 5, wherein each module comprises a battery management system which controls balancing of charging of at least one electrochemical cell of the modules.

17. A system as claimed in claim 7, wherein each module comprises a battery management system which controls balancing of charging of at least one electrochemical cell of the modules.

18. A system as claimed in claim 1, wherein the balancing means comprises shared-inductors and switches actuated for charging or discharging, and the switches are arranged between a cell and the shared-inductors.

19. A system as claimed in claim 2, wherein the balancing means comprises shared-inductors and switches actuated for charging or discharging, and the switches are arranged between a cell and the shared-inductors.

20. A system as claimed in claim 3, wherein the balancing means comprises shared-inductors and switches actuated for charging or discharging, and the switches are arranged between a cell and the shared-inductors.

21. A system as claimed in claim 5, wherein the balancing means comprises shared-inductors and switches actuated for charging or discharging, and the switches are arranged between a cell and the shared-inductors.

22. A system as claimed in claim 7, wherein the balancing means comprises shared-inductors and switches actuated for charging or discharging, and the switches are arranged between a cell and the shared-inductors.

23. A system as claimed in claim 11, wherein the balancing means comprises shared-inductors and switches actuated for charging or discharging, and the switches are arranged between a cell and the shared-inductors.

24. A system as claimed in claim 1, wherein the at least one magnetic storage element comprises at least one transformer.

25. A system as claimed in claim 2, wherein the at least one magnetic storage element comprises at least one transformer.

26. A system as claimed in claim 3, wherein the at least one magnetic storage element comprises at least one transformer.

27. A system as claimed in claim 5, wherein the at least one magnetic storage element comprises at least one transformer.

28. A system as claimed in claim 7, wherein the at least one magnetic storage element comprises at least one transformer.

29. A system as claimed in claim 18, wherein the at least one magnetic storage element comprises at least one transformer.

30. A system as claimed in claim 1, comprising either a hybrid or an electric vehicle.

31. A method for balancing charging of at least two coupled electrical energy storage modules comprising:
    each module including at least one electrochemical cell, a balancing system including at least one magnetic storage element, and a plurality of means for coupling to the other modules with each means for coupling including a control for controlling each of the modules either as a master to be discharged or a slave module to be charged, comprising:
    a) identifying at least one module to be charged and one module to be discharged;
    b) controlling the module to be discharged as a master module and controlling each module to be charged as a slave module; and
    c) performing balancing by charging at least one cell of each slave module to be charged by discharging at least one cell of the master module using the at least one magnetic storage element of the master module to charge each slave module.

32. A method as claimed in claim 31, wherein:
    the module to be charged or discharged is identified by measuring and comparing a voltage in each module.

33. A method as claimed in claim 31, wherein:
    a most charged cell of the master module is identified and balancing is performed by charging of at least one cell of the slave module by discharging the identified most charged cell of the master module.

34. A method as claimed in claim 32, wherein:
    a most charged cell of the master module is identified and balancing is performed by charging of at least one cell of the slave module by discharging the identified most charged cell of the master module.

35. A method as claimed claim 31, wherein:
    the modules are each controlled as either a slave module or as a master module by actuating switches integrated in the plurality of means for coupling each module.

36. A method as claimed claim 32, wherein:
    the modules are each controlled as either a slave module or as a master module by actuating switches integrated in the plurality of means for coupling each module.

37. A method as claimed claim 33, wherein:
    the modules are each controlled as either a slave module or as a master module by actuating switches integrated in the plurality of means for coupling each module.

38. A method as claimed claim 34, wherein:
    the modules are each controlled as either a slave module or as a master module by actuating switches integrated in the plurality of means for coupling each module.

39. A method as claimed in claim 31, wherein:
    step c) is repeated until balancing of the cells is achieved.

40. A method as claimed in claim 32, wherein:
    step c) is repeated until balancing of the cells is achieved.

41. A method as claimed in claim 33, wherein:
    step c) is repeated until balancing of the cells is achieved.

42. A method as claimed in claim 34, wherein:
    step c) is repeated until balancing of the cells is achieved.

* * * * *